United States Patent [19]

Clynch

[11] 3,884,261
[45] May 20, 1975

[54] REMOTELY ACTIVATED VALVE

[76] Inventor: Frank Clynch, 14010 Taylorcrest, Houston, Tex. 77024

[22] Filed: Nov. 26, 1973

[21] Appl. No.: 418,971

[52] U.S. Cl. .................... 137/488; 138/93; 166/53; 166/224 A; 251/30; 251/61.1; 277/34.6
[51] Int. Cl. ....................... E21b 33/10; F16l 55/12
[58] Field of Search ............. 251/1, 5, 61.1; 138/93; 166/224 A, 53; 277/34, 34.6; 299/21; 137/488

[56] References Cited
UNITED STATES PATENTS

| 2,227,730 | 1/1941 | Lynes | 166/187 X |
| 2,750,959 | 6/1956 | Von Seggern | 251/5 X |
| 2,942,666 | 6/1960 | True et al. | 166/187 X |
| 3,401,946 | 9/1968 | Malone | 277/34.6 |
| 3,533,468 | 10/1970 | Lewis et al. | 251/1 X |

Primary Examiner—Martin P. Schwadron
Assistant Examiner—Richard Gerard

[57] ABSTRACT

A valve for a pipe formed from two semicylindrical portions, each of which is enclosed in a rubber envelope. A mounting is provided for rigidly mounting the semicylindrical portions in a generally cylindrical configuration. An anchor is attached to the mounting for securing the valve in the pipe, and a fluid system communicates between the semicylindrical portions and the rubber envelope so that, when fluid is forced in the space between the semicylindrical portions into the rubber envelope, the envelope will expand, both toward the pipe wall, sealing it, and toward the center, closing it off from passage of fluids thereby.

12 Claims, 10 Drawing Figures

PATENTED MAY 20 1975　　3,884,261

REMOTELY ACTIVATED VALVE

DISCUSSION OF THE PRIOR ART

Storm chokes are used in offshore platforms to close off a producing oil well either on command from the surface because of an impending severe storm, such as a hurricane, or because of the occurance of some diaster such as a platform fire. It is advisable that the storm chokes automatically cut off the flow or gas and/or oil when there is a decrease in pressure below a predetermined amount caused by damage to the installation on the surface. Storm chokes generally comprise valves made from metal which can be actuated electrically or hydraulically from the surface. Metal parts, unfortunately, tend to wear or become plugged by the movement of sand along with the oil or gas during normal production of the well. The sand can erode the valve seats or fill the intricate mechanisms generally associated with mechanical valves. When emergencies arise because of the erosion or plugging, the valve will not function.

BRIEF DESCRIPTION OF THE INVENTION

This invention describes a valve which provides a large opening for the flow of material and does not provide any portion of the valve which can be subject to wear or plugging by sand. In case sand should accidentally be trapped between the valve and the well string or casing, the valve can still function, closing off the well to further production. The valve essentially consists of two semicylindrical portions having a rubber envelope surrounding the portions. The portions are mounted to form a tube by attaching a ring to the ends of the semicylindrical portions. One end of the cylinder mounting has attached a retainer which will position the valve at some desired location in a casing which, if necessary, can be removed by a tool inserted into the cylinder. A fluid communication is provided through one end and into each of the semicylindrical portions and to the space between the rubber envelope and each surface of the semicylindrical portions so that fluid pressure entering the fluid communication means will expand the envelope, both against the casing wall and toward each other in the center, blocking off both passages. The fluid means can either be hydraulic fluid or a compressed gas, either of which can be actuated from the surface or by a pressure responsive system near the valve location. The valve also can be used for other purposes than a storm choke. Basically any pipe which requires a shut-off can incorporate the above-described valve, for example, a pipe line, a water main, or similar piping systems.

Figure 7:
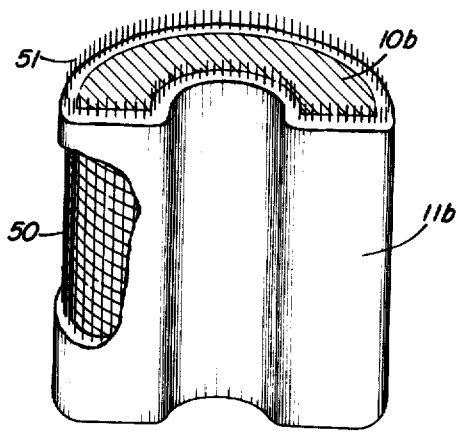
Figure 8:
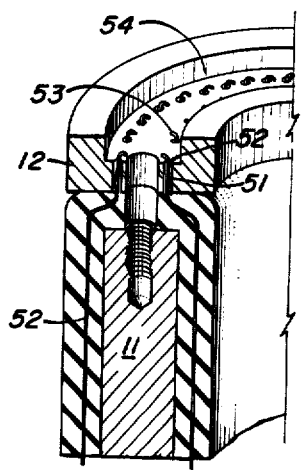
Figure 10:
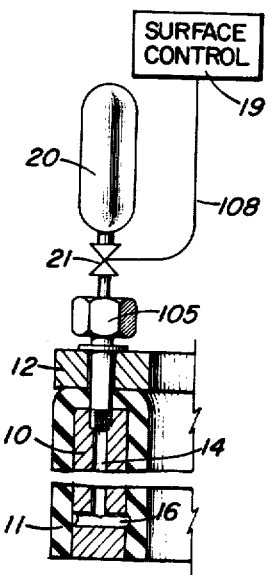
Figure 9:
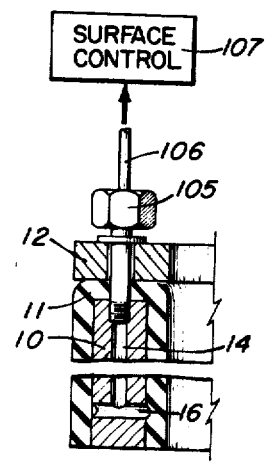
Figure 4:
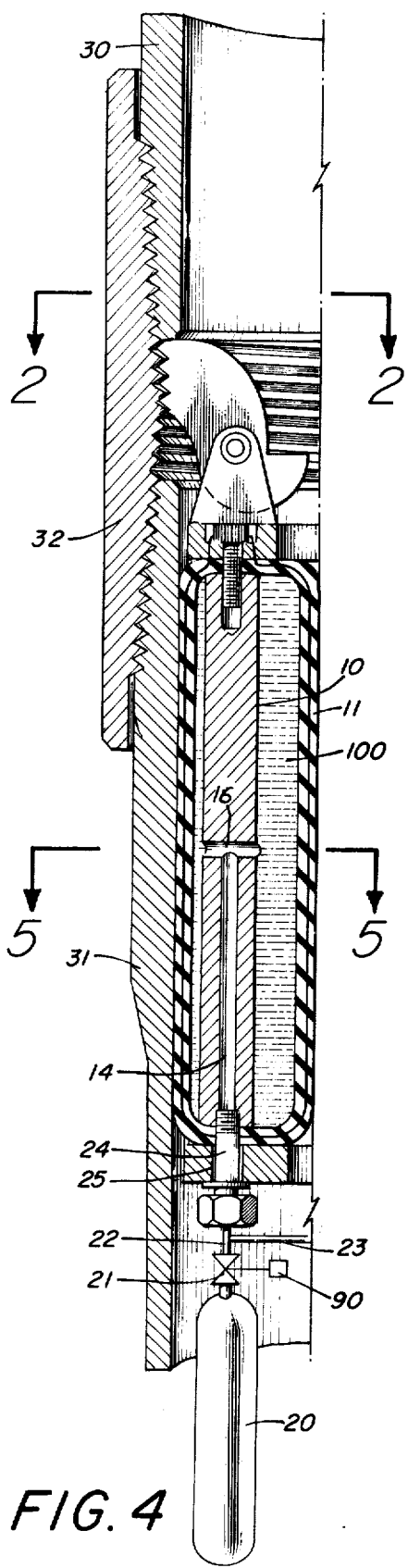
FIG. 4 is a figure used to illustrate the valve in its expanded condition.
Figure 6:
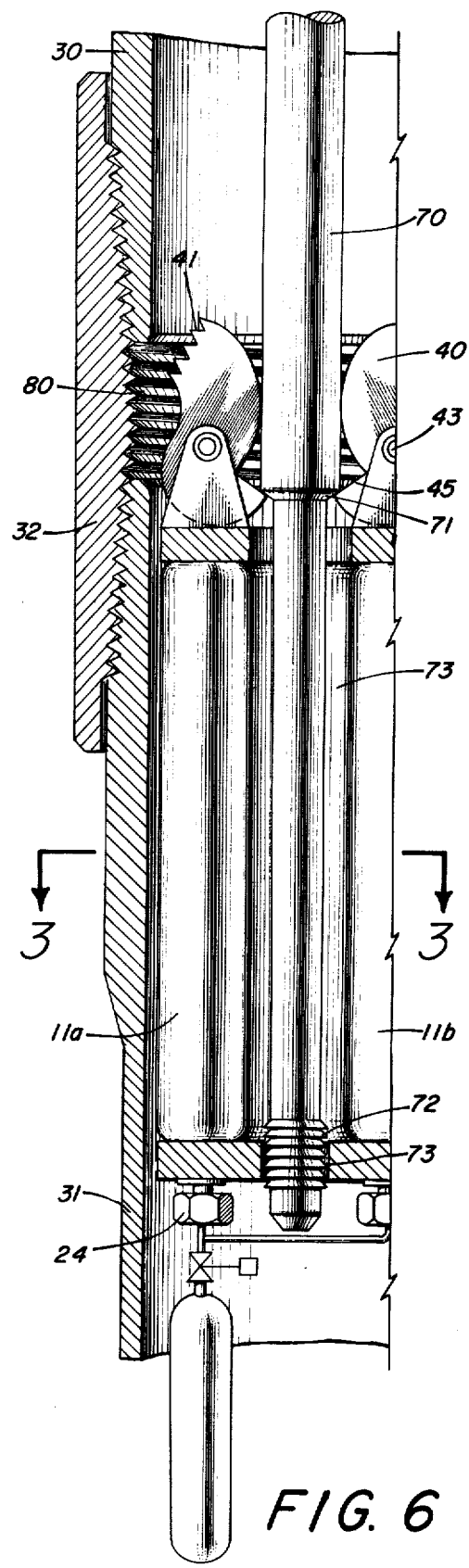

FIG. is a top view of the valve of FIG. 4 taken through lines 5—5;

FIG. 6 is a cross-sectional view of the valve illustrating the tool used to insert and remove the valve from the pipe:

FIG. 7 is a partial sectionalized view of the rubber envelope illustrating the reinforcing material in the envelope;

FIG. 8 is a diagrammatical view of the assembly of the envelope of the top ring mounting;

FIG. 9 is a diagram of the surface control wherein the fluid is pumped into the valve from the surface; and FIG. 10 is a view of a surface control where the fluids are near the valve and the control from the surface operates a remote valve between the source of fluid and the inlet to the valve.

Figure 1:
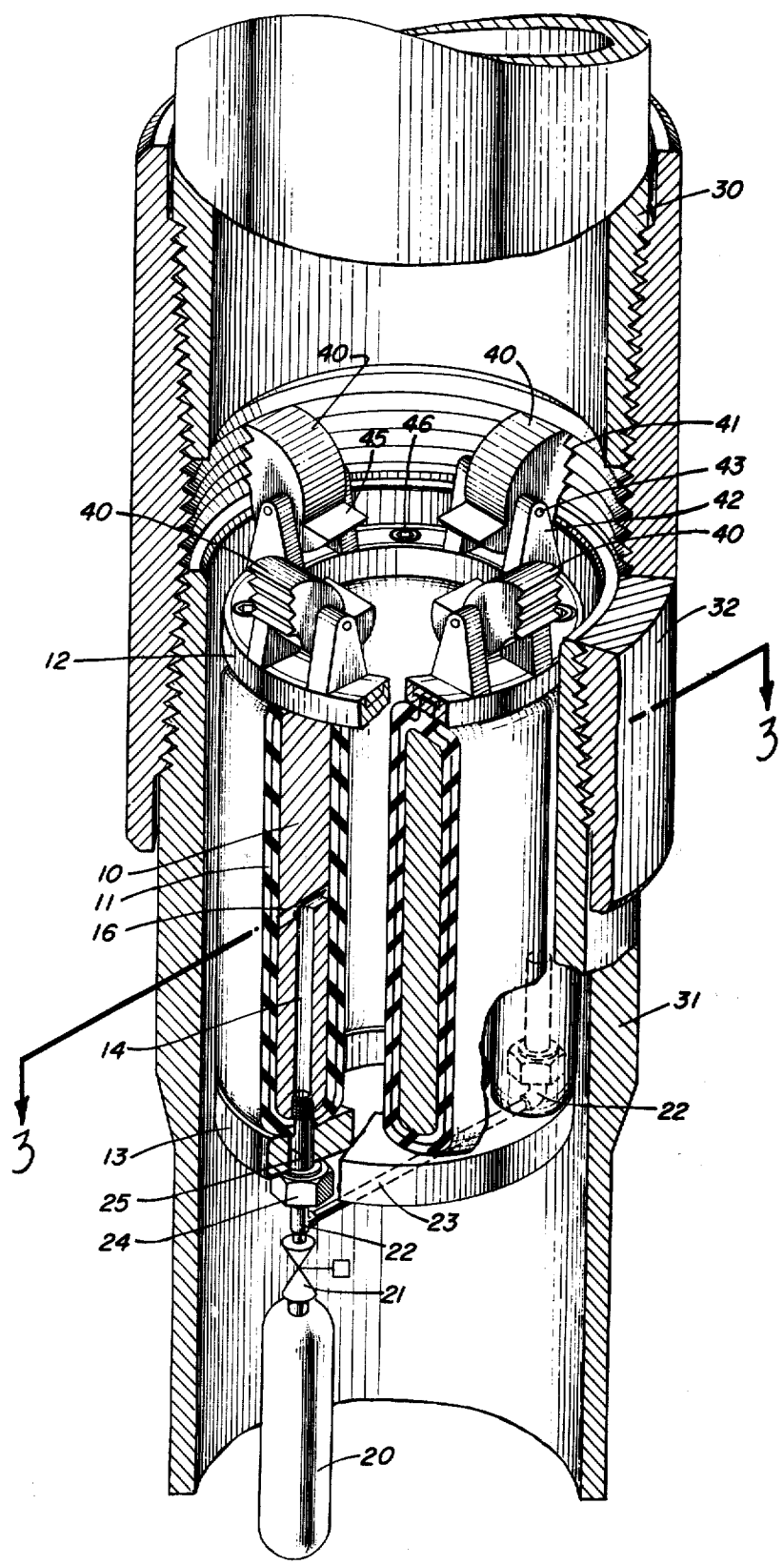
FIG. 1 is a partial cross-sectional view of a well casing illustrating the valve inserted therein and also a partial cross-sectional view of the semicylindrical portion and rubber envelope comprising a portion of the valve.

Referring to all of the figures but in particular to FIG. 1, the valve is illustrated in its preferred embodiment as a storm choke. A semicylindrical portion 10 has a rubber envelope 11 surrounding both the outside and the inside of the semicylindrical portion.

Figure 3:
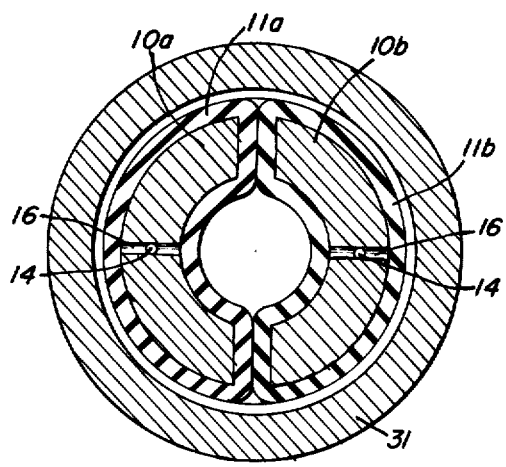
FIG. 3 is a cross-sectional view of the valve and casing taken through lines 3—3 of FIG. 1.
Figure 2:
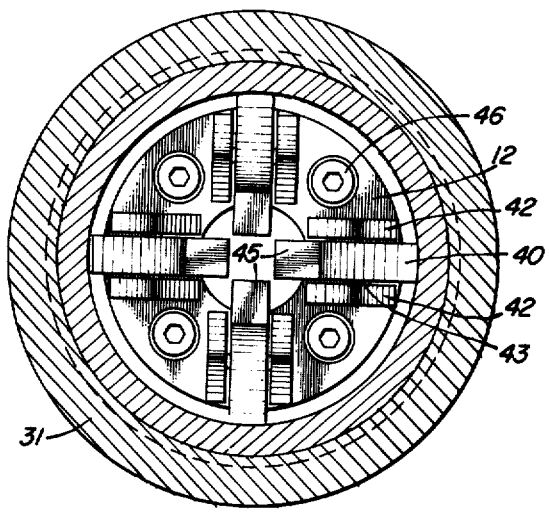
FIG. 2 is a top view of the valve shown in FIG. 1.

Referring to FIGS. 1, 2, and 3, two semicylindrical portions (see FIG. 3) are mounted to form a cylinder by a top ring 12 and a bottom ring 13. A fluid inlet hole 14 and a fluid inlet hole communicating therewith 16 communicates fluids to both sides of semicylindrical portion 10. A source of fluid 20 communicates with hole 14 through a remote valve 21 and pipe 22. A second pipe 23 connects to the other semicylindrical portion so that both sides will be filled simultaneously from source 20. The valve as herein described is designed to fit into a casing such as 30 which is joined to casing 31 by the usual threaded sleeve 32. Valve retaining means comprises a plurality of cams 40 having teeth 41 on the casing side of the cam and cam mounting means 42 mounted normal to the surface of top ring 12 by any usual means such as by screwing or welding the mounting to the ring. It is obvious, of course, that the mounting can also be cast as an integral part of the ring. A pivot rod 43 is mounted into cam mounting means 42 and through cams 40. A surface 45 is adapteed to engage a tool used to insert and remove the valve from engagement with the casing 30. The tool and its operation will be discussed in a later portion of the specification.

Screws 46 attach top ring 12 to the semicylindrical portions 10.

Referring to FIGS. 2 and 3 a more detailed description of the construction of the semicylindrical portions of the cams will be given.

Referring first to FIG. 3 semicylindrical portions 10 comprise a first cylindrical portion 10a and a second cylindrical portion 10b. The rubber envelope 11 completely surrounds semicylindrical portions 10a and 10b. Envelope 11 is made of two integral parts 11a which completely surrounds 10a. Holes or passageways 16 communicate with each side of semicylindrical portions 10a and 10b in order to provide inflation for each half of the rubber envelope.

Referring to FIG. 2 a top view of the cams is illustrated showing top ring 12 and its mounting screws 46 and cam mounting means 42 having cam 40 pivotally positioned therebetween. Rod 43 provides pivotal movement to cam 40.

RUBBER ENVELOPE

A more detailed description of the rubber envelope is given in FIGS. 7 and 8.

Referring to FIG. 7 envelope 11b is illustrated surrounding semicylindrical portion 10b. Envelope 11b is filled with a screen mesh 50 which has the top portion 51 of the mesh 50 projected from the rubber. These portions (see FIG. 8) are then pressed through holes 52 where the ends 53 are bent over to form a mechanically rigid connection. The space 54 is then filled with either a fluid metal or epoxy resin to rigidly secure the ends of the mesh and prevent the ends from pulling out under extremely high pressure.

OPERATION

Figure 5:
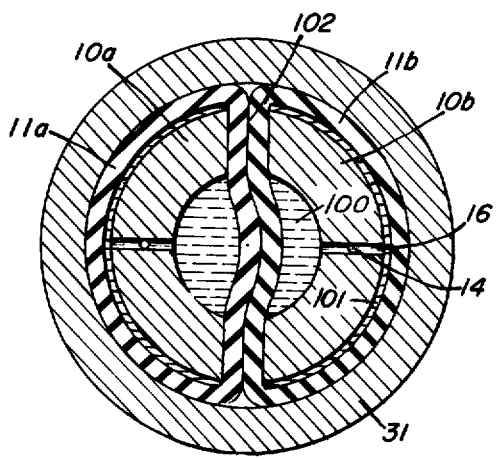

The operation of the apparatus can best be understood by referring to FIGS. 4 through 6. The valve is inserted into the drill casing by a tool 70 having a cam engaging surface 71, and a valve engaging serrated edge 72 engages opening 73 in the bottom ring while camming surface 71 engages surface 45 on cams 40, pulling teeth 41 toward the center and away from the inside wall of casing 30. Cam 40 will rotate about pivot rod 43. Once the tool 70 has positioned the valve at the approximate depth, the tool is removed. Cams 40 will rotate teeth 41 into engagement with the casing 30. The internal pressure in the casing will cause the valve to move until teeth 41 drop into space 80, locking the valve in position. When for some reason pressure should drop at the top of the well, this pressure change will be transmitted down the well and be detected, for example, by a pressure sensor 90. Pressure sensor 90 will open remote valve 21, causing fluid from source 20 to pass through pipes 22 and 23 to passages or holes 14 and 16 into the space between rubber envelope 11 and semicylindrical portion 10. The fluid 100 will force the inside and the outside of the envelope against the other envelope and the casing wall, respectively.

An expanded view of the envelope is illustrated in FIG. 5, with a vertical cross-section of the expanded envelope shown in FIG. 4.

Passage 16 connects with both of the arcuate sides of semicylindrical portions 10a or 10b. As fluid is forced into passage 14 and through passage 16, the fluid will fill portions 100 and 101, compressing the envelopes 11a and 11b against the inner wall of casing 31 and against each other along the mating surface 102, completely shutting off any movement of fluids from below the valve to above the valve. The amount of pressure required to completely close the valve will depend, of course, upon the use of the valve. For example, in a down-well use as a storm choke, several thousand pounds will be required to close off the valve against the down-well pressures of the gas and oil in the well casing. As a pipe line shut-off valve, pressures will be much lower. As a consequence, the shut-off pressure will correspond to the lower pressures involved.

FIGS. 9 and 10 show additional control systems for the valve.

FIG. 9 illustrates a coupling 105 screwed through top ring 12 through envelope 11 and secured into semicylindrical portion 10. Pipe 106 communicates with a surface control 107 which can be a source of hydraulic fluid under pressure or a hydraulic reservoir connected through a pumping system to pipe 106 or surface control 107 can be a source of compressed air. Actuation of the system is at the surface, and release of the valve is at the surface. In the apparatus described in FIG. 9, there is no need to remove the valve in order to return the well to service, since the surface controls, as previously mentioned, can both fill and release the pressure from envelope 11.

FIG. 10 illustrates a down-well pressure reservoir 20 coupled through a valve 21 through a wire 108 to a surface control 109. Surface control 109 can be a battery and switch which supplies power through wire 108 through valve 21. When energy is applied to valve 21, it may open, supplying pressure from reservoir 20 into passages 14 and 16 to the space between semicylindrical portion 10 and envelope 11.

Wire 108, of course, could be a hydraulic conduit, and surface control 109 could be a hydraulically actuated pressure system which be either application of pressure or release of pressure could trigger valve 21.

It is, of course, obvious that other modifications and changes can be made in the apparatus disclosed herein without departing from the spirit and scope of the invention as defined in the specification and appended claims.

I claim:

1. A valve for a pipe comprising:
   a. first and second semicylindrical portions;
   b. first and second flexible envelopes enclosing said first and second semicylindrical portions;
   c. means for rigidly mounting said semicylindrical portions in a generally cylindrical configuration defining first and second ends;
   d. means attached to one end for retaining said cylindrical configuration in a fixed position in said pipe; and
   e. means for filling the space between said first and second semicylindrical portions and associated rubber envelope with a compressed fluid to expand said envelopes into a pipe closing position.

2. A valve as disclosed in claim 1 wherein each of said flexible envelopes contains an impregnated wire mesh having a portion of the mesh rigidly attached to said means for mounting said semi-cylindrical portions.

3. A valve as described in claim 1 wherein said means for filling the space comprises a high pressure fluid-filled container, communication means between said container and said space, and means for controlling the passage of fluid from said container to said communication means.

4. A valve as described in claim 3 wherein said means for controlling the passage of fluid comprises a remote valve and a pressure responsive means connected to operate said remote valve.

5. A valve as described in claim 3 wherein said means for controlling the passage of fluid comprises an electrically actuated remote valve and electrical circuit means connected to said remote valve.

6. A valve as described in claim 3 wherein said means for controlling the passage of fluid comprises a hydraulically controlled remote valve and hydraulic circuit means connected between remote location and said remote valve.

7. A storm choke valve for a well casing comprising:
   a. first and second semicylindrical portions;
   b. first and second ring means;
   c. first and second flexible envelope means covering said first and second semicylindrical portions, respectively;
   d. means for rigidly mounting said first and second envelope covered semicylindrical portions to form a cylinder having a top and bottom, said top being attached to said first ring means and said bottom being attached to said second ring means;

e. casing engaging means mounted to said first ring means;
f. fluid passage means;
g. fluid source means; and
h. means for communicating fluid from said fluid source means through said fluid passage means to each arcuate side of each of said semicylindrical portions to expand said envelopes into a pipe closing position.

8. A valve as described in claim 7 wherein each of said flexible envelopes contains an impregnated wire mesh having a portion of the mesh rigidly attached to said means for mounting said semi-cylindrical portions.

9. A valve as described in claim 7 wherein said (means for filling the space) fluid source means comprises a high pressure fluid-filled container, (communication means between said container and said space, and) and wherein said fluid passage means includes means for controlling the passage of fluid from said high pressure container to said fluid passage means.

10. A valve as described in claim 9 wherein said means for controlling the passage of fluid comprises a remote valve and a pressure responsive means connected to operate said remote valve.

11. A valve as described in claim 9 wherein said means for controlling the passage of fluid comprises an electrically actuated remote valve and electrical circuit means connected to said remote valve.

12. A valve as described in claim 9 wherein said means for controlling the passage of fluid comprises a hydraulically controlled remote valve and hydraulic circuit means connected between a remote location and said remote valve.

* * * * *